Patented Oct. 1, 1946

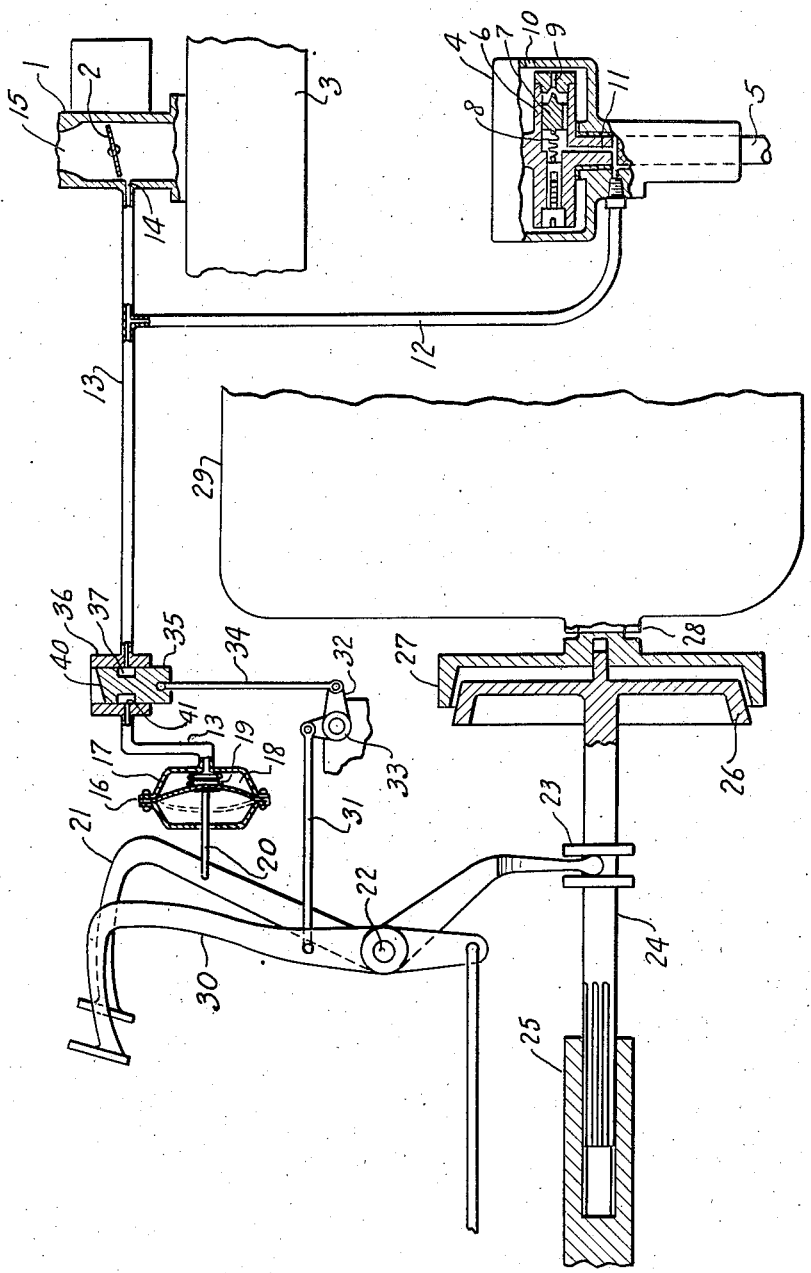

2,408,566

UNITED STATES PATENT OFFICE 2,408,566

FREE-WHEELING DEVICE FOR AUTOMOTIVE VEHICLES

Marion Mallory, Detroit, Mich.

Application August 31, 1944, Serial No. 552,021

4 Claims. (Cl. 192—.01)

This invention relates to a free-wheeling device for an automotive vehicle.

Free-wheeling devices have been used extensively on automotive vehicles but have been discarded largely for the following reasons: First, the free-wheeling device maintained the car in free-wheeling, that is, the engine was disengaged from the propeller shaft and rear wheels as long as the vehicle was overrunning the engine. This was a source of danger because the engine could not serve as a brake to assist the mechanical brakes in stopping the car. Secondly, this inability of the engine to serve as a brake caused undue wear on the mechanical brakes. Further, since this free-wheeling condition obtained until the car ceased to overrun the engine, the engine frequently stalled.

It is the object of this invention to produce a free-wheeling device which eliminates all of the above disadvantages of the free-wheeling devices heretofore known. This object is achieved by arranging my free-wheeling device so that it cuts out simultaneously with the application of the mechanical brakes so that both engine and mechanical brakes are used for braking the vehicle as soon as the brake pedal is engaged. My free-wheeling device is also made inoperative as soon as the vehicle comes down to a low speed, say ten miles per hour. In other words, the vehicle is automatically connected to the engine at low speeds to prevent stalling of the engine.

The drawing shows my free-wheeling device applied to an automotive vehicle.

The various elements of my free-wheeling device and the parts associated therewith are designated as follows: carburetor 1, throttle valve 2, engine intake manifold 3, stationary valve housing 4, rotary shaft 5 which is run off a moving part of the vehicle such as the propeller shaft 25 in accordance with the speed of the vehicle, valve housing 6 mounted on shaft 5, centrifugally unbalanced valve 7 slidably mounted in housing 6, tension spring 8 tending to hold valve 7 inwardly, orifice 9 controlled by valve 7, outlet 10 to atmosphere in housing 4, passageway 11 in shaft 5 which communicates continuously at one end with housing 6 and at the other end with conduit 12, conduit 13 communicating with orifice 14 in the intake passageway 15 adjacent throttle valve 2, suction device 16 including housing 17 connected with conduit 13 and closed by flexible diaphragm 18, compression spring 19 tending to bias diaphragm 18 toward the left, link 20 connecting diaphragm 18 with the clutch pedal 21 pivoted as at 22, clutch collar 23 on clutch splined shaft 24, transmission shaft 25, driven clutch plate 26, driving clutch plate 27 mounted on the engine crankshaft 28, engine 29, brake pedal 30 pivoted as at 22, link 31 connecting brake lever 30 with bell crank 32 pivoted as at 33, link 34 connecting bell crank 32 with piston valve 35, valve cylinder 36 in conduit 13, circumferential groove 37 in piston valve 35.

The operation of my device is as follows: Assuming the vehicle is traveling at a rate less than ten miles per hour, orifice 14 will be on the engine side of throttle valve 2 but the centrifugal valve 7 will be open and air bleed suction device 16 to atmosphere through orifices 9 and 10 which nullifies its power. Naturally, the spring 19 or the clutch pedal spring commonly used will move collar 23 towards the engine and maintain a connection between the vehicle and the engine, i. e., engage clutch 26, 27. In the event the vehicle speed is increased by moving throttle valve 2 toward an open position, the vacuum or suction will drop in conduit 13 because orifice 14 is thereby placed on the atmospheric side of throttle valve 2. Although centrifugal valve 7 is closed at all speeds above ten miles an hour, the device will be inoperative at all times that orifice 14 is on the atmospheric side of the throttle. If the vehicle is running 50, 40, 30, 20, or even 15 miles an hour, centrifugal valve 7 will be in a position to close port 9 and if the accelerator pedal is released, orifice 14 will immediately be located between the engine and the throttle 2 or in the high suction zone, and the high suction in suction device 17 will disengage the clutch 26, 27 or the vehicle from the engine. Naturally, the engine ceases to be a brake on the vehicle and the vehicle will coast freely or for long distances on the small amount of gas the engine uses for idling. If it is desired to slow the vehicle down, the brake pedal 30 is engaged which pulls piston 35 downwardly to clear orifice 41 and air bleeds suction device at the top of piston through orifice 41 to atmosphere. This air bleeding vents the suction device 17 and causes the clutch to become engaged with the engine so that the engine will assist in braking the vehicle, eliminating danger heretofore common in other free-wheeling devices.

In the event the brake is not applied, my free-wheeling device will become inoperative as soon as the vehicle reaches or decelerates to ten miles an hour because then valve 7 will open to air-bleed suction device 17. This prevents stalling of the engine which is common in other free-wheeling devices.

The cause of stalling in other free-wheeling devices is as follows: If the engine is running at 30, 20 or 15 miles an hour under considerable load, the carburetor is delivering considerable fuel and if the throttle is suddenly closed and the vehicle disconnected from the engine simultaneously, the engine speed will immediately drop to idle and the rich fuel lying in the manifold will cause the engine to stall. If the free-wheeling continues until the vehicle reaches a very low speed, that is, if the vehicle does not connect back to the engine until it reaches a very low speed, it will not turn the engine over fast enough to clean out the rich mixtures lying in the manifold so the engine will start. In my device the engine is connected to the vehicle, i. e., the free-wheeling is cut out, before the vehicle reaches such a low speed thereby giving ample time to clean out the manifold and start the engine again in the event the engine stalls due to reasons above explained. By connecting the engine to the vehicle, I mean placing the engine in driving relationship with the driven wheels of the vehicle so that the engine propels the vehicle. Such a driving connection can be accomplished in numerous well-known ways, either mechanically or hydraulically, and clutch 26, 27 ilustrates one mode of connecting the engine to the vehicle.

I claim:

1. In an automotive vehicle including an internal combustion engine having an intake passageway, a throttle valve in said intake passageway, a driven shaft, a clutch between said engine and driven shaft, a device actuated in response to intake passageway pressure, an orifice in the intake passageway on the engine side of the throttle valve when in idle position and passing on to the atmosphere side of the throttle valve when opened beyond idle position, a conduit connecting said device into said orifice, an air bleed to atmosphere for said pressure actuated device, a centrifugally unbalanced valve rotated in accordance with the vehicle speed for closing said air bleed whenever the vehicle exceeds a predetermined speed, and a connection between said pressure actuated device and the clutch, whereby when said throttle is in engine idling position and the vehicle is traveling in excess of said predetermined speed the pressure actuated device responds to the intake passageway pressure and disengages said clutch.

2. In an automotive vehicle including an internal combustion engine having an intake passageway, means for effecting a driving relationship between the engine and the vehicle, a device actuated in response to intake passageway pressure, a connection between said pressure actuated device and the aforesaid means, a throttle valve in said intake passageway, a conduit connecting the pressure actuated device with the intake passageway on the engine side of the throttle when in idle position and on the atmosphere side of the throttle when moved toward open position, a speed controlled air bleed to atmosphere for said pressure actuated device, said speed controlled air bleed comprising a valve housing rotated in accordance with vehicle speed and having an orifice to atmosphere, a centrifugally unbalanced valve in said housing controlling said orifice, and a conduit connecting said housing with said pressure actuated device, said speed controlled air bleed constructed and arranged to open and air bleed the pressure actuated device to atmosphere when the vehicle speed falls below a predetermined speed whereby said pressure actuated device operates the aforesaid means to effect a driving relationship between the engine and vehicle even though the throttle valve is in idle position, the said pressure actuated device actuating the aforesaid means to disconnect the engine from the vehicle when the throttle valve is in idle position and the speed controlled air bleed is closed, and braking means for said vehicle, and a device operated by said braking means for rendering the pressure actuated device ineffective to disconnect the engine from the vehicle whenever the braking means is applied to brake the vehicle.

3. In an automotive vehicle including an internal combustion engine having an intake passageway, a driven shaft, a clutch between said engine and driven shaft, a device actuated in response to intake passageway pressure, a connection between said pressure actuated device and the clutch, and a throttle valve in said intake passageway, an orifice in the intake passageway on the engine side of the throttle valve when in idle position and passing on to the atmosphere side of the throttle valve when opened beyond idle position, a conduit connecting said orifice with the pressure actuated device whereby when said throttle is in engine idling position the pressure actuated device responds to the intake passageway pressure and disengages said clutch, and an air bleed to atmosphere for said pressure actuated device, and a centrifugally unbalanced valve which is rotated in accordance with the vehicle speed for shutting off said air bleed when the vehicle exceeds a predetermined speed.

4. In an automotive vehicle including an internal combustion engine having an intake passageway, a clutch for said engine including driving and driven members, a throttle valve in said intake passageway, a device actuated in response to intake passageway pressures, a conduit connecting said device with the intake passageway on the engine side of said throttle valve when in idle position and on the atmosphere side of said throttle valve when opened from idle position, braking mechanism for said vehicle, and valve means for controlling said conduit, a connection between said valve means and the braking mechanism whereby when the braking mechanism is applied the valve means closes the conduit and bleeds the pressure actuated device to atmosphere, a connection between said pressure actuated device and the clutch for disengaging the clutch whenever the pressure actuated device is subjected to the intake passageway pressures when the throttle valve is in idle position, a rotary valve housing rotated in accordance with vehicle speed having an air bleed to atmosphere for said pressure actuated device, and a centrifugally unbalanced valve in said housing for closing said air bleed whenever the vehicle speed exceeds a predetermined speed.

MARION MALLORY.